United States Patent [19]
Carter

[11] Patent Number: 5,926,798
[45] Date of Patent: Jul. 20, 1999

[54] METHOD AND APPARATUS FOR PERFORMING COMPUTER-BASED ON-LINE COMMERCE USING AN INTELLIGENT AGENT

[75] Inventor: John Mervyn Carter, Chilworth, United Kingdom

[73] Assignee: International Business Machines Corporation, Armonk, N.Y.

[21] Appl. No.: 08/870,683

[22] Filed: Jun. 6, 1997

[30] Foreign Application Priority Data

Nov. 28, 1996 [GB] United Kingdom .................... 9624711

[51] Int. Cl.⁶ ........................................ G06F 17/00
[52] U.S. Cl. ........................... 705/26; 705/1; 705/6
[58] Field of Search ............................ 705/26, 6, 50

[56] References Cited

U.S. PATENT DOCUMENTS

| | | | |
|---|---|---|---|
| 4,862,357 | 8/1989 | Ahlstrom | 705/6 |
| 4,992,940 | 2/1991 | Dworkin | 705/26 |
| 5,237,499 | 8/1993 | Garback | 364/407 |
| 5,331,546 | 7/1994 | Webber et al. | 364/407 |
| 5,576,951 | 11/1996 | Lockwood | 395/227 |

FOREIGN PATENT DOCUMENTS

WO 96/25012  8/1996  WIPO .

*Primary Examiner*—Allen R. MacDonald
*Assistant Examiner*—Penny Caudle
*Attorney, Agent, or Firm*—Jeanine S. Ray-Yarletts

[57] ABSTRACT

A method, computer program product and system, for performing computer-based on-line commerce in which a client computer issues a commercial request and a plurality of server computers is available to service said request, said method, performed by an intelligent agent, comprising steps of: receiving said request from said client computer; reviewing content-related information and business policies of each server computer of said plurality of server computers; and making decisions as to which server should serve the request based on said content-related information and said business policies.

11 Claims, 3 Drawing Sheets

METHOD AND APPARATUS FOR PERFORMING COMPUTER-BASED ON-LINE COMMERCE USING AN INTELLIGENT AGENT

FIELD OF THE INVENTION

The present invention relates to computer-based on-line commerce, where a computer user buys goods or services through his computer by linking his computer with that of a plurality of sellers through a computer network.

BACKGROUND OF THE INVENTION

As networks of linked computers become an increasingly more prevalent concept in everyday life, so-called "on-line" interactions between computer users has begun to spread into many different areas of our lives. One of these areas is the marketplace for goods and services.

In the past couple of years there has been an explosive growth in the use of the globally-linked network of computers known as the Internet, and in particular of the WorldWide Web (WWW), which is one of the facilities provided on top of the Internet. The WWW comprises many pages or files of information, distributed across many different server computer systems. Information stored on such pages can be, for example, details of a company's organization, contact data, product data and company news. This information can be presented to the user's computer system ("client computer system") using a combination of text, graphics, audio data and video data. Each page is identified by a Universal Resource Locator (URL). The URL denotes both the server machine, and the particular file or page on that machine. There may be many pages or URLs resident on a single server.

In order to use the WWW, a client computer system runs a piece of software known as a graphical Web browser, such as WebExplorer (provided as part of the OS/2 operating system from IBM Corporation), or the Navigator program available from Netscape Communications Corporation. "WebExplorer", "OS/2" and "IBM" are trademarks of the International Business Machines Corporation, while "Navigator" and "Netscape" are trademarks of the Netscape Communications Corporation. The client computer system interacts with the browser to select a particular URL, which in turn causes the browser to send a request for that URL or page to the server identified in the URL. Typically the server responds to the request by retrieving the requested page, and transmitting the data for that page back to the requesting client computer system (the client/server interaction is performed in accordance with the hypertext transport protocol ("HTTP")). This page is then displayed to the user on the client screen. The client may also cause the server to launch an application, for example to search for WWW pages relating to particular topics.

Most WWW pages are formatted in accordance with a computer program written in a language known as HTML (hypertext mark-up language). This program contains the data to be displayed via the client's graphical browser as well as formatting commands which tell the browser how to display the data. Thus a typical Web page includes text together with embedded formatting commands, referred to as tags, which can be used to control the font size, the font style (for example, whether italic or bold), how to lay-out the text, and so on. A Web browser "parses" the HTML script in order to display the text in accordance with the specified format. HTML tags are also used to indicate how graphics, audio and video are manifested to the user via the client's browser.

Most Web pages also contain one or more references to other Web pages, which need not be on the same server as the original page. Such references may generally be activated by the user selecting particular locations on the screen, typically by clicking a mouse control button. These references or locations are known as hyperlinks, and are typically flagged by the browser in a particular manner (for example, any text associated with a hyperlink may be in a different colour). If a user selects the hyperlink, then the referenced page is retrieved and replaces the currently displayed page.

Further information about HTML and the WWW can be found in "World Wide Web and HTML" by Douglas McArthur, p18–26 in Dr Dobbs Journal, December 1994, and in "The HTML SourceBook" by Ian Graham, (John Wiley, New York, 1995).

Enterprises (companies) are considering their usage of the World Wide Web. The first phase, namely the publicity of the company in whatever form, has already occurred. Home pages are commonplace, an essential ingredient for any company which wishes to maintain itself in line with current business practices. The publicity material contains marketing information, product brands and, in some cases, product catalogues.

The second phase, namely to conduct commerce, is emerging. Enterprises are poised to conduct business by way of the World Wide Web. They are seeking to make sales of their products and services, by way of the World Wide Web.

Software infrastructure is coming into existence to enable the progress of this trend. Secure financial protocols have been defined and are being implemented. The provision of firewall technologies offer safeguards to the enterprise, without which the enterprise would not contemplate permitting access to its critical data. Gateway products are becoming available to facilitate connection between the World Wide Web and the server machines of the enterprise.

Thus, many suppliers have begun to sell their goods and services over the World Wide Web by placing their catalogues on their Web pages, such catalogues listing content-related information (e.g. product description, price, availability) about the various goods and services offered for sale. They also list their business policies concerning, for example, their cancellation policy. That is, the cancellation policy specifies what will happen if a customer decides to buy something and later changes his mind.

If the buyer tries to do this on his own without any help, this can be a frustrating and confusing experience as many different competing suppliers must be contacted to determine who can supply the correct product/service at the best price. This problem is compounded when a group of inter-related requests are being simultaneously coordinated. For example, a buyer may wish to book a theatre reservation, restaurant reservation as well as parking.

So-called intelligent agents are available to help an "on-line" buyer in these situations. Intelligent agents are computer programs that simulate a human relationship by doing something that another person could otherwise do for you. For example, the Telescript agent software developed by General Magic, a Silicon Valley start-up company, supports the deployment of software agents to act as personal delegates across a computer network ("Telescript" is a trademark of General Magic company). The agent performs various tasks at electronic venues (servers) called "places" which include electronic mailboxes, calendars and marketplaces.

The Telescript agents gather information resourcefully and negotiate deals on behalf of the client buyer (the principal for whom the agent is working). The agent can be customized by each individual buyer/user so that the agent reflects the choices and desires of the buyer/user. The agents are intelligent in the sense that they can execute contingency plans if the most preferred plan is not feasible given the supplier resources and the general server environment at the time of the agent's dispatch. The Telescript agent can be sent to an electronic florist, ticket seller and restaurant to perform a shopping trip for the client on the other side of the computer network. The details of such software agents are well known and are explained, for example, in *Internet Agents, Spiders, Wanderers, Brokers, and Bots,* Fah-Chun Cheong, New Riders Publishing, Indianapolis, Ind., USA, 1996. Further details can be found on General Magic's World Wide Web site (http://www.genmagic.com).

When an intelligent agent such as Telescript contacts appropriate suppliers (servers) of the same good or service in order to determine which of the plurality of competing suppliers to choose to supply a particular good or service requested by the client, the agent uses only "content-related" information provided by the suppliers in order to make a decision. That is, the agent looks only at whether the supplier can supply the required content of the request. For example, if the client requests a particular videotape to be rented the intelligent agent electronically "goes" to a plurality of on-line videotape rental companies and checks each company to see if they have the particular videotape in stock. The agent also looks at other content-related information such as rental price. However, the agent does not take other considerations into account beyond such content-related information.

Since known software agents use only content-related considerations in deciding amongst a plurality of competing suppliers, a request is processed in such a way that the agent expends the least effort in making a decision as to which of a plurality of competing suppliers to use. While the agent is relieved from having to perform extra processing steps, this least effort approach does not always result in the best possible solution for the client. For example, the agent may choose a particular supplier because of price but not take into account the supplier's cancellation policy which may prove detrimental to the client should the client wish to cancel.

Also, known intelligent agents have not taken into account implications resulting from the order in which portions of a multi-portion request are booked. That is, if a theatre ticket is booked before a restaurant reservation, and an appropriate restaurant is not available for the night in which the theatre is booked, it will be necessary to cancel the theatre reservation which could mean losing the funds expended, as most theatres will not give a refund for cancellations (while most restaurants do not even require advance payment at all).

As another example, a buyer may be trying to coordinate a group of interrelated "on-line" purchase related to a two-week trip overseas. The buyer may wish to book not only the airline reservation but also the parking at the airport (or bus/train reservations), hotel, rental car and restaurant reservations. If the agent books the airline reservation, hotel and rental car it may then turn out that airport parking (and bus/train reservations) is either unavailable or too inconvenient to match up with the other booked reservations. This would require having to recontact the suppliers of the booked reservations and trying to renegotiate a new booking. In the case of the airline, this is oftentimes difficult to impossible without incurring substantial financial losses.

With this booking approach currently used by intelligent agents, there is a good chance that it will be very difficult to recover expended funds made for booked transactions in the event a cancellation must occur.

SUMMARY OF THE INVENTION

The present invention provides a method of performing computer-based on-line commerce in which a client computer issues a commercial request and a plurality of server computers is available to service said request, said method, performed by an intelligent agent, comprising steps of: receiving said request from said client computer; reviewing content-related information and business policies of each server computer of said plurality of server computers; and making decisions as to which server should serve the request based on said content-related information and said business policies.

In a preferred embodiment, the request issued by the client computer is made up of a group of inter-related sub-requests, and said intelligent agent decides which server should serve each sub-request based on said content-related information and said business policies. Further, said business policies of each server include cancellation conditions concerning consequences of cancelling service by that server once a decision is made by the intelligent agent to use that server to serve a particular sub-request, said conditions ranging from a first extreme where cancellation is most difficult to a second extreme where cancellation is easiest; and further wherein, after making preliminary decisions as to which server should serve which request based on said content related information, said intelligent agent makes final decisions on said group of requests in the order such that a sub-request matched with a server with a cancellation condition closest to or at said second extreme is decided upon first.

According to other aspects of the invention, the invention is drawn to an intelligent agent for performing the above method steps, and to a computer-based on-line commerce system using an intelligent agent which performs the above method steps.

According to a preferred embodiment, final decisions on remaining requests of said group are made in a descending order from said second cancellation condition extreme to said first cancellation condition extreme. Also, said first cancellation policy extreme is one where no recovery of any expended funds is allowed and said second extreme is one where total recovery of any expended funds is allowed.

According to the preferred embodiment, once a preliminary decision is made as to which server should satisfy which request based on content-related considerations, the decision is not made final at that point and no final commitment with any server has yet been made. Instead, the commitments are made in a certain order. First, the commitments which are most easily cancelled are made. Lastly, after the easily cancelled commitments are made, the commitments which are more difficult to cancel are made. Therefore, the difficulties of having to go back and try to unbook a commitment in order to accommodate other commitments is minimized. If an easily cancelled commitment is not convenient with respect to a later considered more difficult to cancel commitment, the easily cancelled commitment can be simply cancelled and rebooked by the intelligent agent, without any loss being incurred.

BRIEF DESCRIPTION OF THE DRAWINGS

Preferred embodiments of the invention will be described in detail below with reference to the following figures.

DETAILED DESCRIPTION OF THE PREFERRED EMBODIMENTS OF THE INVENTION

Figure 1:
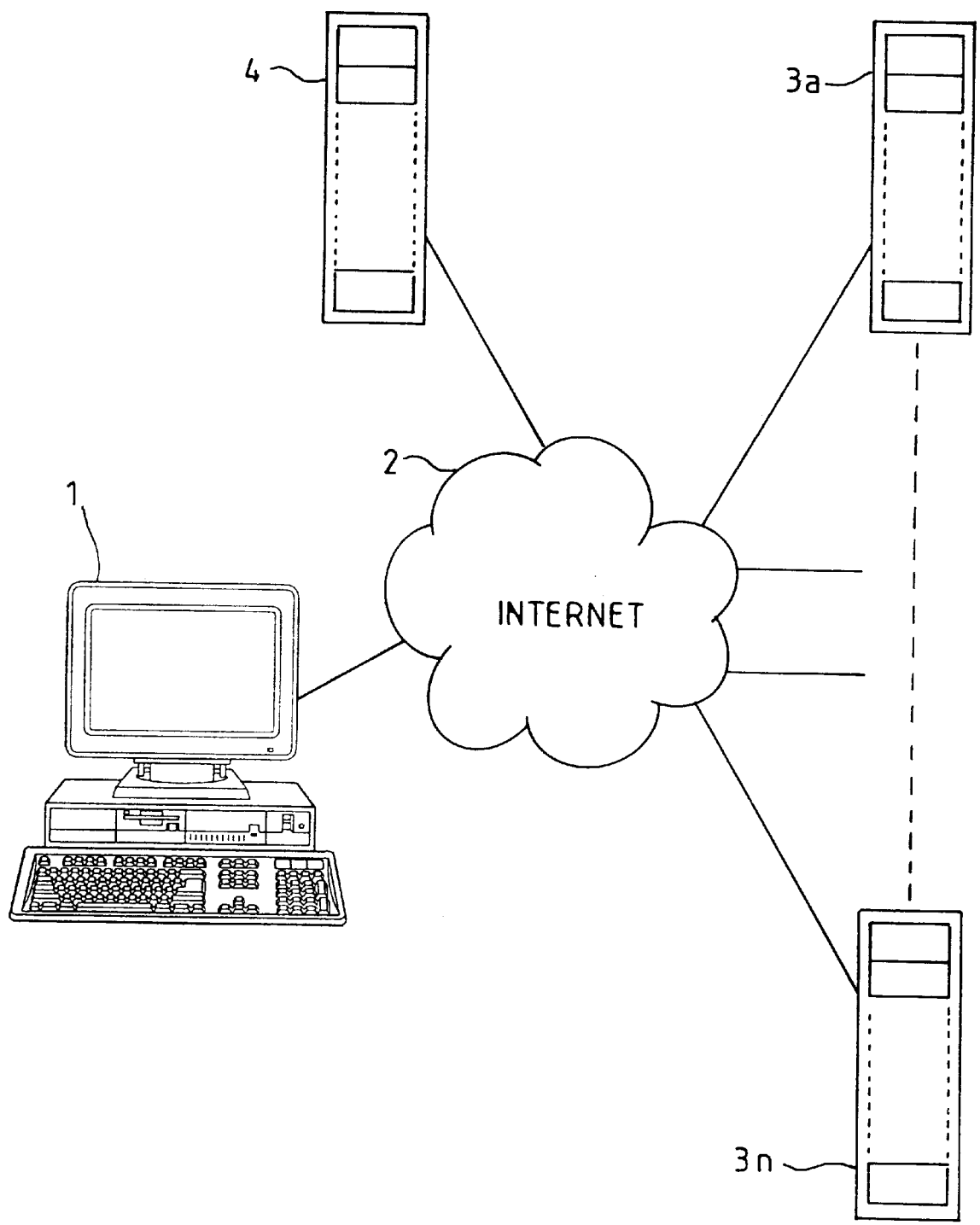
FIG. 1 shows a basic system configuration in which the present invention operates, according to a preferred embodiment.

As shown in FIG. 1, a preferred embodiment of the present invention involves a client computer system 1 running a Web browser and connected to the Internet 2. A plurality of server computer systems 3a–3n are also connected to the Internet and run Web server software in a well known manner. Another computer system 4 is provided for running the intelligent agent software. This software can be stored, for example, on the hard drive or in semiconductor memory of system 4. The client system 1 communicates first with the agent system 4 which in turn contacts the servers 3a to 3n. It should be noted that the agent software does not have to be running on a separate computer system 4 but can be run on the client system 1 or alternatively on one of the servers 3a to 3n.

The agent software running on computer system 4 performs a group of related business transactions for its client computer system 1. The client computer system 1 makes a request of its agent system 4 and this request causes the agent to access the servers 3a to 3n, review their services, price structures and business policies and perform the group of business transactions on behalf of the client system 1.

Business Transactions

Business Transactions are characterised by:
multiple, yet separate, traditional transactions (local and/or distributed),
   which gives rise to the potential for time windows, during which some part(s) of the overall business transaction can be observed to be complete,
   not uncommonly they are of long duration (even weeks or months),
   and involve a wide distributed environment.

The business transaction is exemplified by the long-term car parking scenario, with its several time independent phases, namely:
   initiating the service (entering the car park),
   terminating the service (leaving the car park, and initiating payment, for example by cheque or credit card),
   settling the payment (though the client's bank), and,
   accounting reconciliation (within the car parking business).

This example also shows the separation of the main interactions, firstly between the customer and the supplier to request and obtain the product or service, and secondly, between the financial bodies representing the customer and the supplier in order to transfer the appropriate payment.

It is worth noting that, at least in theory, this second stage does not necessarily involve either the customer or the supplier.

If the car parking scenario was a "stand alone" business transaction, then the "requesting the product" phase involves a straightforward interaction between only the consumer and the supplier. However, it is very conceivable that this activity is just a part of some larger business transaction, such as involving the reservation of flights, hotels and other travel related commodities.

An individual consumer might choose to undertake each of the various and separate interactions with the autonomous suppliers in order to arrange all the elements needed to meet the specification of the complete package. However as the complexity of the package increases, so it is more likely that the individual will wish to delegate some, or all, of the organisation to an agent.

As we shall see, whether or not an individual or an agent is responsible for assembling the various elements, the business policies of the suppliers influence the strategy by which the complete package is constructed.

Agent Strategy

Consider a scenario in which an individual wishes to organise an evening out, including say, reservations for a theatre and a restaurant. This implies the confluence of three conditions, namely:
   a) the availability of the individual,
   b) the availability of a seat in the (desired) theatre (at the right price), and,
   c) the availability of a place at the (desired) restaurant (again at right price).

However, the theatre has a business policy which requires payment with the order and does not make any refund on a ticket once it is sold. On the other hand, the restaurant business only charges its customers once it knows what they have consumed, and therefore accepts cancellations (since these are preferable to "no-shows"). Under these circumstances what strategy should the organiser adopt?

If there are more appropriate restaurants than theatres, it would seem natural to reserve the theatre first and then to book one of the several possible restaurants. However, such an approach is based on the statistical chances of success. This may be warranted in practice, but it is a policy of risk, because if none of the possible choices of restaurant can accept the reservation, then the organiser now has a theatre booking which is no longer required and for which it is difficult to recover the financial commitment. Therefore in terms of reducing the effort for recovery, Applicant has found that it is better if the reservation for the theatre is made after the reservation for the restaurant. This is because the theatre is the party imposing the most severe conditions on the organiser.

Figure 2:
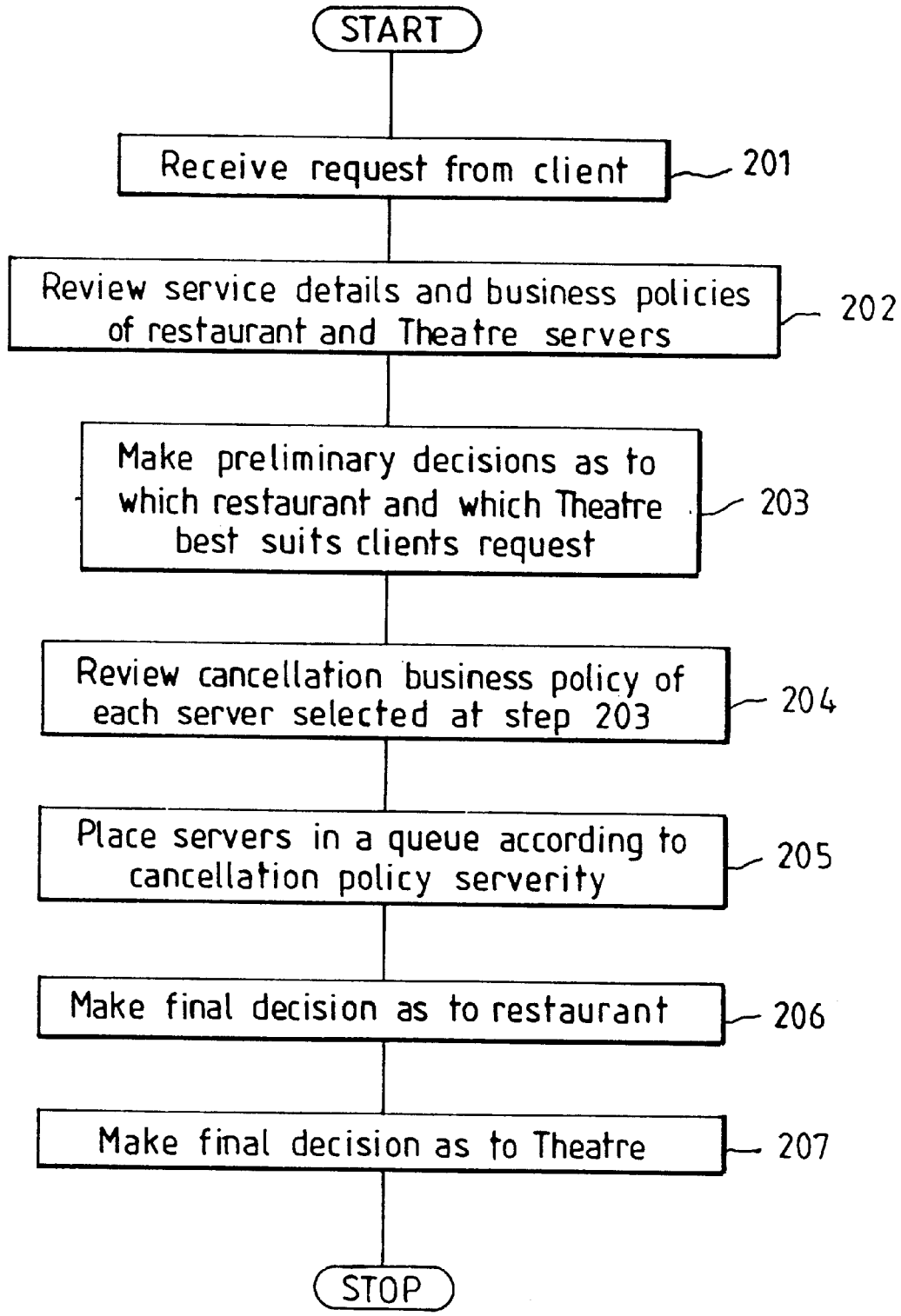
FIG. 2 is a flow chart showing the steps performed by an intelligent agent illustrating a specific example of on-line commerce according to a preferred embodiment of the present invention.

FIG. 2 shows an example of the software program steps which the agent computer system 4 would execute in order to minimize the costs of totally cancelling a booked group of business transactions related to an evening out at the theatre. The client request would include, for example, whether the client wishes to view a particular show at a particular theatre or a particular type of show (e.g. a comedy) at any theatre etc. The request could also inform the agent of the type of restaurant desired. The request also has a day or range of days which the client would find most acceptable.

In response to receiving the client request, the agent begins its routine. At step 201 the agent receives the request from the client and analyzes its details. As part of this review, the days of the individual's availability may be checked, for example, by examining the individual's electronic diary stored via a personal information manager software program on the client computer system 1, to make sure the individual is indeed available on the days specified. At step 202, the agent 4 checks the various servers 3a to 3n which represent companies dealing in theatre and restaurant services, and examines their service details and business policies. The purpose is to check each server's service details and policies to see how well that server could satisfy the appropriate part of the client's request. For example, the theatre servers would be examined to see if they had the requested show type and theatre type, and if they were available on the days in which the client is available. The restaurant servers are similarly checked. The agent also checks the business policies to determine which server is giving the best deal in terms of price, quality etc.

Then, at step 203, based on the data collected in the previous steps, the agent chooses the most appropriate restaurant and theatre servers which are available on a day which is acceptable to the client. A preliminary decision is made, at this point, as to which servers will be used. The selected servers and date are stored in memory without making a final commitment with respect to any server.

At step 204, the agent 4 reviews a specific one of the business policies of each server, the cancellation business policy. Usually, for the theatre, the policy will be that there is no refund available in case of a cancellation. The money is simply kept by the theatre. On the other hand, the restaurant would usually have a policy of not requiring money in advance, so there is no loss to the client (or agent) upon cancellation of that part of the overall group of transactions. The selected servers are placed in a queue according to the severity of their cancellation policies at step 205. The restaurant would be first in the queue as it has the least severe cancellation policy. The theatre would be last in the queue as it has the most severe cancellation policy.

At step 206, the restaurant server preliminarily selected at step 203 is now booked, as this server has the least severe cancellation policy as compared to the other preliminarily selected servers at step 203 (the theatre in this example). Then, at step 207, the theatre server which was selected at step 203 is now booked.

Obviously, this is rather "pure" logic, and in practice an organiser would make some optimisations, such as dealing only with the theatre based on the days of availability of the individual; that is the organiser would be making an assumption about the availability of the restaurant (or have a choice of restaurants). This greatly simplifies the logic since this probably reduces the whole process to a single interaction with the theatre.

The logic does illustrate some points which would be significant in a more complex business scenario:

1. The time window between the inquiry and the reservation of a particular service gives rise to the possibility of a change in state in availability of that service, when the client finally attempts to make the reservation. For example, had the theatre indicated that there were seats available for a particular performance at the time of the client's inquiry, then by the time that client requested the reservation (having made inquiries for other services comprising the overall requirement) those seats may have been allocated to other clients. (This is because the reservation was not attempted "atomically" at the time of the inquiry. It is worth noting that if the server had the capability of handling multiple inquiries simultaneously, then even making the reservation during the inquiry call might not be sufficiently "atomic".)
2. The fact that the business transaction is a number of small autonomous transactions, each contributing their own commitment to the overall transaction in an incremental manner.
3. The principle of making the commitments in the order of those with the weakest constraints to those with the severest constraints, the concept being that at any stage in the making of the sequence of commitments those made earlier imply less effort to change.

Accordingly, if the agent wishes to minimise the effort of recovery, then it will pursue a strategy of obtaining the commitment of the required services, in the order of increasing effort of change, that is starting with the service for which the effort of rework is the least and finishing with that for which that effort is the most.

Applicant has found that the cancellation policies of the various suppliers should be taken into account in order to eliminate the problems of having to recontact a supplier of a booked request in order to try to unbook the request and obtain a refund in situations where other requests can not be conveniently matched with the booked request.

Some examples of commands which an agent would make to a server while carrying out the review of content-related information and business policies of each server (as in steps 202 and 204 of the above example) are as follows.

Inquire_Server_Capabilities
  To determine the functions supported by a server.
Inquire_Server_Policies
  To identify the business policies of the server, for example does the server provide "credit on cancellation". This information would enable the agent to determine its strategy for handling this server.
Inquire_Goods/Services/Availability/Cost
  To provide details concerning goods/services offered by a server and the availability and/or cost of a good or service.
Inquire_Booking/Reservation/Waitlisted_Reservation
  To return the current status of a specified order.
Make_Reservation
  To prepare the server for an order, which will be cancelled or confirmed subsequently. There is an implied timeout for a reservation established by the business terms and conditions of the server.
Cancel_Reservation
  To cancel a reservation (equivalent to a "rollback" against a prepared server).
Confirm_Reservation
  To finalize a reservation (equivalent to a "commit" against a prepared server).
Cancel_Booking
  To cancel a confirmed order.
Make_Booking
  To establish a confirmed reservation. This is logically equivalent to a Make_Reservation with an immediate Confirm_Reservation, the difference being that it is an atomic action (i.e. there is no time window separating the two operations.
Make_Waitlisted_Reservation
  To be placed on notification of the server's ability to accept an order.
Cancel_Waitlisted_Reservation
  To remove a potential order from the waitlist.

Figure 3:
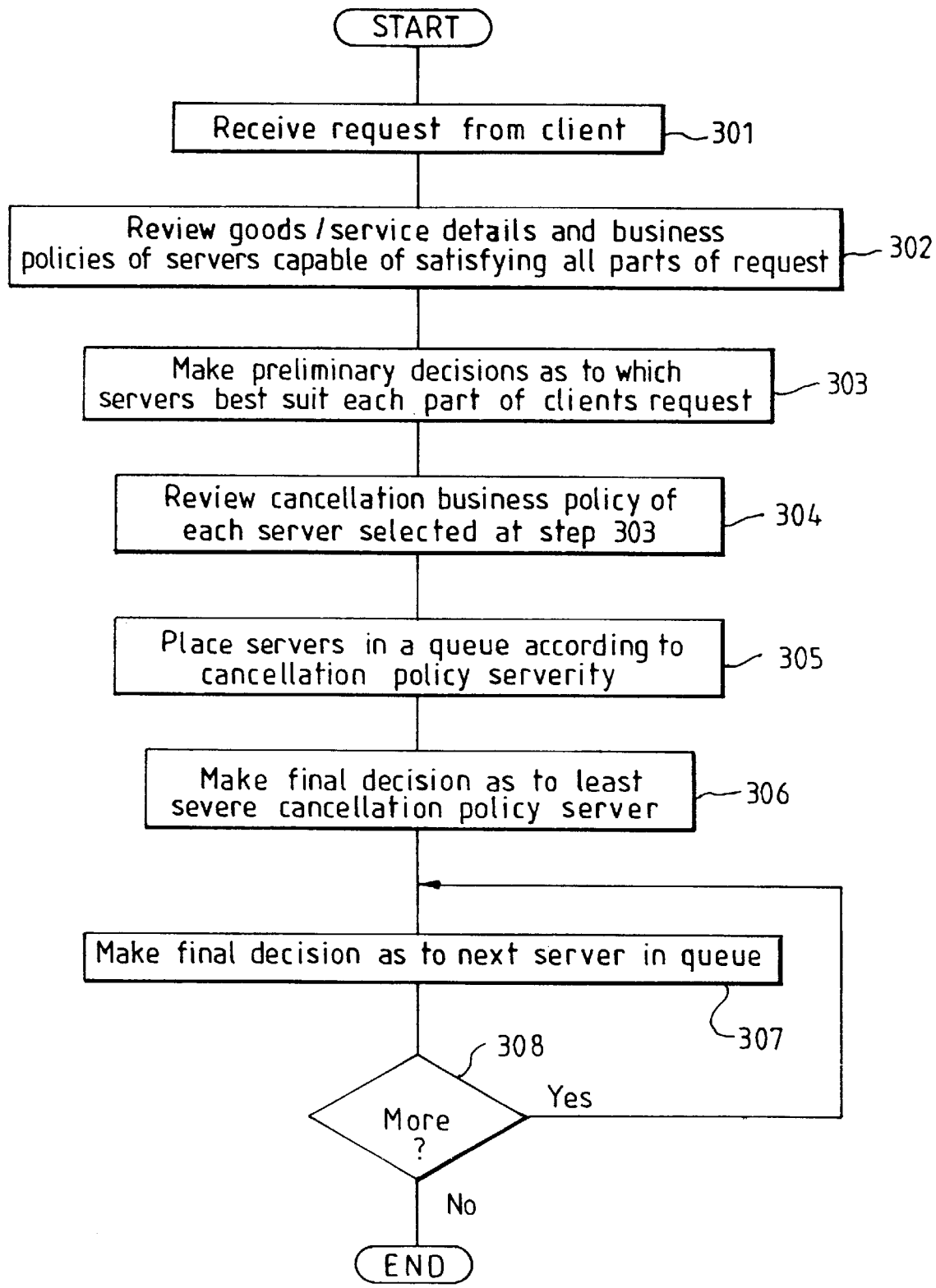
FIG. 3 is a flow chart showing the steps performed by an intelligent agent according to a preferred embodiment of the present invention.

FIG. 3 shows a generalized flowchart (a specific business context is not mentioned) of a preferred embodiment of the software steps carried out by the agent 4. First, at step 301 the request from the client 1 is received by the agent 4. At step 302, the agent 4 reviews the content-related details and business policies of the servers 3a–3n capable of satisfying the various parts of the client request.

Then, at step 303, agent 4 makes preliminary decisions as to which servers best suit each part of the overall client request using only the content-related information. These servers are separated from the rest by, for example, storing server identifications of these servers in a memory at the agent 4. Next, at step 304 the cancellation business policy of each server selected at step 303 is examined. At step 305, the servers are placed in a queue according to cancellation policy severity. The identification of the least severe cancellation policy server is placed first, followed by that of any equal severity cancellation policy server, followed by the identification of the next least severe cancellation policy server. The last member of the queue is the identification of the server having the most severe cancellation policy.

At steps 306–308, the agent 4 contacts each server in the queue in the order in which they appear in the queue, and finalizes the transactions with them in the queued order. That is, the agent first (step 306) contacts the server having the least severe cancellation policy and performs the necessary steps to make the transaction final with that server (e.g., give the client's credit card number and expiry date to the server and tell the server that the client wishes to use that server). The agent then contacts the next server in the queue (step 307) and proceeds in a similar fashion. At step 308 the agent checks whether there are any remaining servers in the queue. If there are, control loops back to step 307. If not, the control program ends and the agent informs the client of the final bookings.

While a preferred embodiment of the invention has been described with respect to a group of inter-related requests (sub-requests), the invention is broader than this and relates also to a single request situation where business policies are used, in addition to content-related information, by the intelligent agent in deciding which supplier to choose to satisfy the request. For example, the invention is also drawn to the first two steps 301 and 302 of FIG. 3, along with a modified step 303 which makes a final decision as to which server to use for the request based on both content-related details (goods/services details) and business policies of the suppliers/servers.

Also, while the preferred embodiment has been described in the context of the World Wide Web, other electronic commerce environments are also contemplated within the scope of the invention.

I claim:

1. A method of performing computer-based on-line commerce in which a client computer issues a commercial request and a plurality of server computers is available to service said request, said method, performed by an intelligent agent, comprising steps of:

receiving said request from said client computer;

reviewing content-related information and business policies of each server computer of said plurality of server computers; and making decisions as to which server should serve the request based on said content-related information and said business policies, wherein the request issued by the client computer is made up of a group of inter-related sub-requests, and said intelligent agent decides which server should serve each sub-request based on said content-related information and said business policies;

wherein said business policies of each server include cancellation conditions concerning consequences of cancelling service by that server once a decision is made by the intelligent agent to use that server to serve a particular sub-request, said conditions ranging from a first extreme where cancellation is most difficult to a second extreme where cancellation is easiest; and wherein, after making preliminary decisions as to which server should serve which request based on said content related information, said intelligent agent makes final decisions on said group of requests in the order such that a sub-request matched with a server with a cancellation condition closest to or at said second extreme is decided upon first.

2. The method of claim 1, wherein final decisions on remaining sub-requests of said group are made in a descending order from said second cancellation condition extreme to said first cancellation condition extreme.

3. The method of claim 1 wherein said first extreme is one where no recovery of any expended funds is allowed and said second extreme is one where total recovery of any expended funds is allowed.

4. An intelligent agent computer program product, stored on a computer readable storage medium, which performs computer-based on-line commerce in which a client computer issues a commercial request and a plurality of server computers is available to service said request, said intelligent agent comprising:

means for receiving said request from said client computer;

means for reviewing content-related information and business policies of each server computer of said plurality of server computers; and means for making decisions as to which server should serve the request based on said content-related information and said business policies;

wherein the request issued by the client computer is made up of a group of inter-related sub-requests, and said intelligent agent decides which server should serve each sub-request based on said content-related information and said business policies;

wherein said business policies of each server include cancellation conditions concerning consequences of cancelling service by that server once a decision is made by the intelligent agent to use that server to serve a particular sub-request, said conditions ranging from a first extreme where cancellation is most difficult to a second extreme where cancellation is easiest; and wherein, after making preliminary decisions as to which server should serve which request based on said content related information, said intelligent agent makes final decisions on said group of requests in the order such that a sub-request matched with a server with a cancellation condition closest to or at said second extreme is decided upon first.

5. A system for performing computer-based on-line commerce in which a client computer issues a commercial request and a plurality of server computers is available to service said request, said system having an intelligent agent comprising:

means for receiving said request from said client computer;

means for reviewing content-related information and business policies of each server computer of said plurality of server computers; and means for making decisions as to which server should serve the request based on said content-related information and said business policies;

wherein the request issued by the client computer is made up of a group of inter-related sub-requests, and said intelligent agent decides which server should serve each sub-request based on said content-related information and said business policies;

wherein said business policies of each server include cancellation conditions concerning consequences of cancelling service by that server once a decision is made by the intelligent agent to use that server to serve a particular sub-request, said conditions ranging from a first extreme where cancellation is most difficult to a second extreme where cancellation is easiest; and wherein, after making preliminary decisions as to which server should serve which request based on said content related information, said intelligent agent makes final decisions on said group of requests in the order such that a sub-request matched with a server with a cancellation condition closest to or at said second extreme is decided upon first.

6. The method of claim 1 wherein said client computer runs a World Wide Web browser application.

7. The method of claim 1 wherein said request is received from the client computer over the Internet.

8. The intelligent agent of claim 4 wherein said client computer runs a World Wide Web browser application.

9. The intelligent agent of claim 4 wherein said request is received from a client computer over the Internet.

10. The system of claim 5 wherein said client computer runs a World Wide Web browser application.

11. The system of claim 5 wherein said request is received from the client computer over the Internet.

* * * * *